(12) United States Patent
Lewallen et al.

(10) Patent No.: US 7,985,027 B2
(45) Date of Patent: Jul. 26, 2011

(54) ADAPTER ASSEMBLY FOR COUPLING DISSIMILAR FIBER OPTIC CONNECTORS

(75) Inventors: Christopher Paul Lewallen, Hudson, NC (US); James P. Luther, Hickory, NC (US); Xin Liu, Hickory, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/598,926

(22) Filed: Nov. 14, 2006

(65) Prior Publication Data

US 2008/0112672 A1    May 15, 2008

(51) Int. Cl.
*G02B 6/36* (2006.01)
(52) U.S. Cl. ............................................ 385/78; 385/60
(58) Field of Classification Search ................ 385/53–94
See application file for complete search history.

(56) References Cited

U.S. PATENT DOCUMENTS

| | | | |
|---|---|---|---|
| 5,129,023 A * | 7/1992 | Anderson et al. | 385/70 |
| 5,751,874 A | 5/1998 | Chudoba et al. | 385/72 |
| 5,778,122 A | 7/1998 | Giebel et al. | 385/55 |
| 5,887,095 A | 3/1999 | Nagase et al. | 385/58 |
| 5,993,071 A | 11/1999 | Hultermans | 385/70 |
| 6,186,670 B1 * | 2/2001 | Austin et al. | 385/55 |
| 6,579,014 B2 | 6/2003 | Melton et al. | 385/76 |
| 6,634,796 B2 * | 10/2003 | de Jong et al. | 385/56 |
| 6,659,654 B2 * | 12/2003 | Kao | 385/78 |
| 6,688,780 B2 * | 2/2004 | Duran | 385/76 |
| 6,698,938 B2 | 3/2004 | Ziegler et al. | 385/77 |
| 6,926,449 B1 | 8/2005 | Keenum et al. | 385/76 |
| 6,944,378 B1 | 9/2005 | Belew et al. | 385/52 |
| 2004/0101253 A1 * | 5/2004 | Jong et al. | 385/78 |
| 2006/0204178 A1 | 9/2006 | Theuerkorn et al. | 385/59 |
| 2007/0036489 A1 * | 2/2007 | Grzegorzewska et al. | 385/78 |

FOREIGN PATENT DOCUMENTS

| | | |
|---|---|---|
| DE | 10114144 A1 | 10/2002 |
| EP | 0936484 A1 | 8/1999 |
| EP | 1041417 A2 | 10/2000 |
| EP | 1150149 A2 | 10/2001 |
| WO | WO90/15350 | 12/1990 |

* cited by examiner

*Primary Examiner* — Charlie Peng

(57) ABSTRACT

An adapter assembly for receiving and maintaining mating fiber optic connectors, comprising an adapter housing defining at least one feature for engaging with at least one plug housing engaged with at least one of the first and second fiber optic connectors, and at least one alignment member maintained within the adapter housing for receiving connective ends of each of the first and second fiber optic connectors. An adapter assembly for receiving and maintaining mating first and second fiber optic connectors, wherein the connectors may be similar or dissimilar and while reducing side load forces through the use of a stabilizing member.

27 Claims, 16 Drawing Sheets

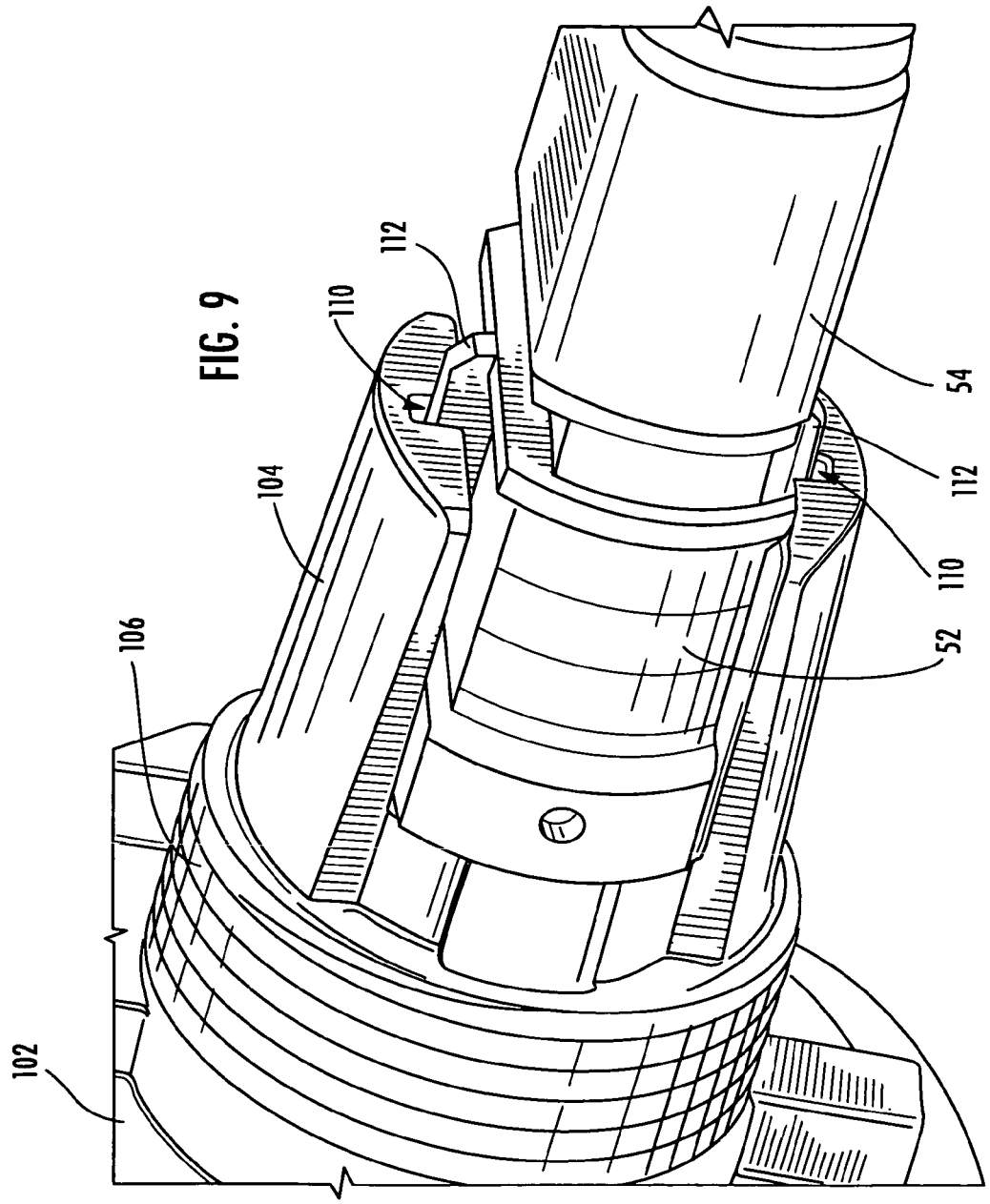

ADAPTER ASSEMBLY FOR COUPLING DISSIMILAR FIBER OPTIC CONNECTORS

BACKGROUND OF THE INVENTION

1. Field of the Invention

The present invention relates generally to adapter assemblies for receiving fiber optic connectors, and more particularly, to adapter assemblies for receiving, maintaining and aligning dissimilar fiber optic connectors while reducing side loading forces acting upon the connectors.

2. Technical Background

It is often necessary within fiber optic networks to optically connect optical fibers through mating connectors. Mating connectors may include connector alignment features on the ferrules themselves for fine alignment, but are typically grossly aligned using some form of adapter assembly. Adapters may be stand-alone components or may be maintained within network structures, walls or receptacles, such as within a receptacle held within a network connection terminal. While like connectors may be mated using certain types of adapters, mating dissimilar connector types requires a more complex adapter design. Desirable adapters should not only properly align mating connectors, but should also protect the mating connectors and optical fibers from adverse environmental and mechanical influences, such as from side loading, rotational and tensile forces.

Conventional adapter assemblies often include an adapter housing defining an internal cavity that houses an alignment sleeve. The alignment sleeve is typically inserted into the adapter housing and is designed to receive mating connectors each typically mounted upon an end of a fiber optic cable, for example a drop cable. The alignment sleeve assists in gross alignment of the ferrules, and ferrule guide pins or other alignment means assist in detailed alignment of the optical fibers mounted within and presented through the end faces of each ferrule. While conventional adapter assemblies exist for aligning like connectors, it would be desirable to provide a connector for mating dissimilar connectors, for example, an adapter for mating a FOCIS compliant MTP connector with a CON2R connector available from Corning Cable Systems of Hickory, N.C. It would further be desirable to provide an adapter assembly including a housing capable of accommodating alignment sleeves of varying sizes for receiving different connector types. A desirable adapter would provide proper connector maintenance and alignment while reducing or eliminating forces applied to connectors engaged with conventional adapters.

SUMMARY OF THE INVENTION

To achieve the foregoing and other objects, and in accordance with the purposes of the invention as embodied and broadly described herein, the present invention provides various embodiments of adapter assemblies having an improved design such that dissimilar fiber optic connectors may be aligned and mated. The present invention also provides various embodiments of adapter assemblies designed to readily mate and align any type of optical connector with any other type of optical connector in a precise manner while providing resistance against mechanical forces including, but not limited to, side load, tensile and rotational forces.

In one embodiment, the present invention provides an adapter assembly having a housing defining a first end, a second end and an internal cavity for housing at least one alignment sleeve operable for aligning and interconnecting optical fibers of mating fiber optic connectors. In one embodiment, the housing and alignment sleeve may each comprise first and second halves that are joined together in a known manner. In another embodiment, the housing and alignment sleeve may each comprise a single component. In embodiments comprising multiple component alignment sleeves, a first sleeve component may be inserted into one end of the housing and a second sleeve component may be inserted into the other end of the housing. Components may be like in structure or may be different depending upon similar or dissimilar connector types being mated. By way of example, one component of the alignment sleeve may accommodate an MTP-type connector and another component may accommodate a CON2R-MT-type connector available from Corning Cable Systems of Hickory, N.C. In exemplary embodiments, the housing is configured to permit the insertion/removal of the alignment sleeves from either end of the housing. In other exemplary embodiments, the alignment sleeves are retained within the internal cavity via a retaining mechanism of the type known in the art. Each alignment sleeve defines at least one lengthwise longitudinally extending passageway opening through opposed first and second ends adapted to receive at least one mating fiber optic connector. Each connector typically includes at least one ferrule mounted upon the end of at least one optical fiber, such as optical fibers of at least one drop cable.

In another embodiment, the housing may define at least one slot for receiving at least one protrusion of a lengthened corresponding plug, such that side load and other mechanical forces placed upon a mating connector is reduced or minimized. The slots are configured such that an inserted connector is maintained in a fixed position. The slots may include a pair of guide channels operable for engaging ribs. The guide channels and ribs cooperate to prevent the plug from being improperly loaded into the adapter housing. In addition, the guide channels and ribs, and the extended length of the plug receiving portion provide added protection to an inserted connector from side-loading forces.

In another embodiment, the present invention provides connector adapters for receiving corresponding plug housings, wherein the adapters define features for receiving features of the plug housing, and the plug housing provides protection of an inserted connector from forces. The adapter defines at least one lengthwise longitudinally extending passageway opening through opposed first and second ends adapted to receive a connector maintained within a plug housing. The first end of the adapter is a mating end adapted to mate with a plug and plug housing, and the second end may be connected to another adapter or mounted to a network structure. The plug housing, also referred to herein as a "stabilizer member" or "connector pull", defines a longitudinally extending passageway therethrough for receiving at least one connector. The plug housing may be internally configured to receive any type of connector including, but not limited to, SC, LC, MTP, MT-RJ, SC-DC and CON2R-MT type connectors. The external structure of the plug housing may be standard such that it may be received within a standard adapter. The adapter may include an internal alignment sleeve for aligning mating connectors. The plug housing is inserted into the connector receiving end of the adapter such that a fiber optic connector may be inserted into the plug housing and into the adapter. In the various embodiments described below, the plug housing accepts side-loading forces and prevents them from reaching the connector.

In other exemplary embodiments, plug housings are provided having varying shapes and structures for engaging connector adapters. The plug housing structure is operable for preventing forces from the reaching the connector. The plug housings may include arms, fins, slots, tabs or other structure and engage an adapter at one or more points or by one or more features of the adapter. For example, alignment and pull fins may be received within slots. In other exemplary embodiments, the adapter may be provided with an excess length and geometry that closely fits around the plug housing, and vice-versa. In yet another exemplary embodiment, a plug housing may have a cup-like configuration that substantially fits over a portion of the adapter. In still another exemplary embodiment, a plug housing may be provided with features that extend over at least one corner of the adapter.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which:

FIG. 9 is a perspective view of a plug assembly shown received within an adapter assembly.

DETAILED DESCRIPTION OF THE PREFERRED EMBODIMENTS

Figure 1A:
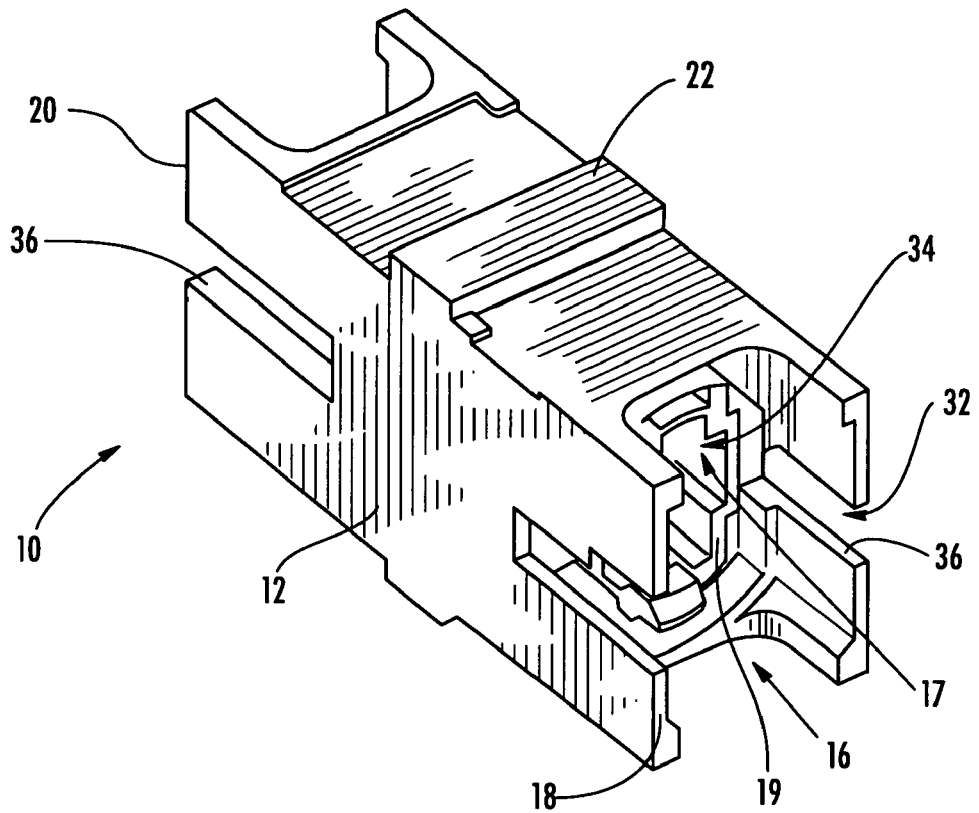
FIGS. 1A-C are perspective views of an MTP-type adapter and corresponding plug shown in disengaged and engaged configurations.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In exemplary embodiments described below, adapter assemblies are provided for receiving and maintaining fiber optic connectors of varying types, and is some embodiments, adapters for receiving dissimilar connectors within a single adapter. As will be understood by those skilled in the art, connectors may be of any type of connector known in the art including, but not limited to, SC, LC, FC, MTP, MT-RJ and CON2R-MT connectors. By way of example, one MT connector may be of the type conventionally known by the acronym "MTP." U.S. Pat. No. 5,214,730 to Nagasawa et al. shows exemplary types of MTP connectors, see FIGS. 9-11 and 26-30 therein, as well as describes a variety of multi-fiber ferrules that are used in such connectors. By way of another example, U.S. patent application Ser. No. 11/076684 to Theuerkom shows another connector type known by the acronym "CON2R-MT," which is available from Corning Cable Systems of Hickory, N.C. In other exemplary embodiments, improved alignment sleeves and plug housings are provided such that greater resistance against mechanical forces, such as side loads, applied on ferrules and ferrule connections is provided.

An adapter assembly is an interconnection point for optical fibers within a communications network. An adapter of the present invention may be designed such that it may be utilized for indoor or outdoor connections, or mounted within a wall of an enclosure, closure, housing or other structure defining a wall or port through which one or more optical fibers are typically interconnected. An adapter assembly of the present invention may also be mounted within a network connection terminal, pedestal, network interface device or like structure. An adapter assembly of the present invention may also be a stand-alone component.

An adapter assembly of the present invention typically receives a plug assembly mounted upon the end of at least one fiber optic cable including one or more optical fibers. As used herein, the fiber optic cable associated with the fiber optic plug is referred to as a "drop cable" and is intended to include all types of fiber optic cables such as, but not limited to, distribution cables, drop cables, dielectric cables and armored drop cables. Although a drop cable typically comprises less than 12 optical fibers, it is envisioned that the drop cable may include one or more fibers. Particular components of the adapter assembly described herein may be modified to accommodate different cable types and different optical connectors. As used herein, the term "optical fiber" is intended to include all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers or any other expedient for transmitting light signals.

Figure 1B:
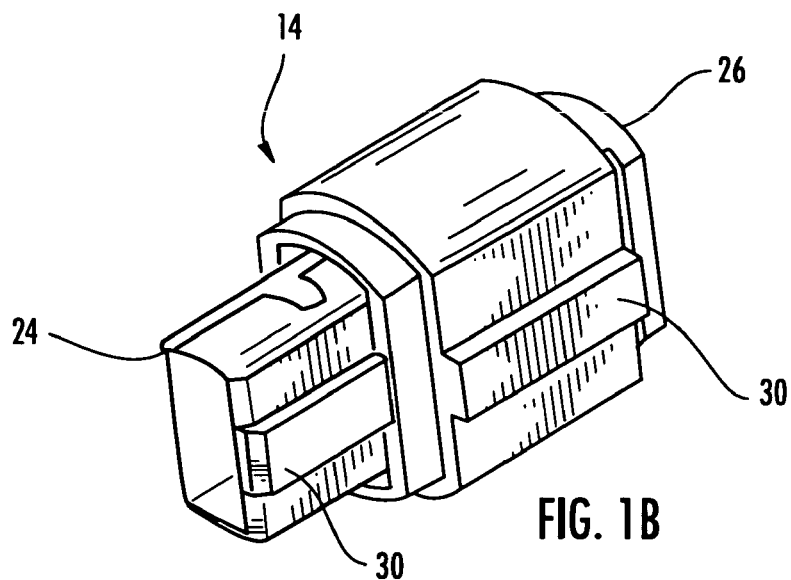
Figure 1C:
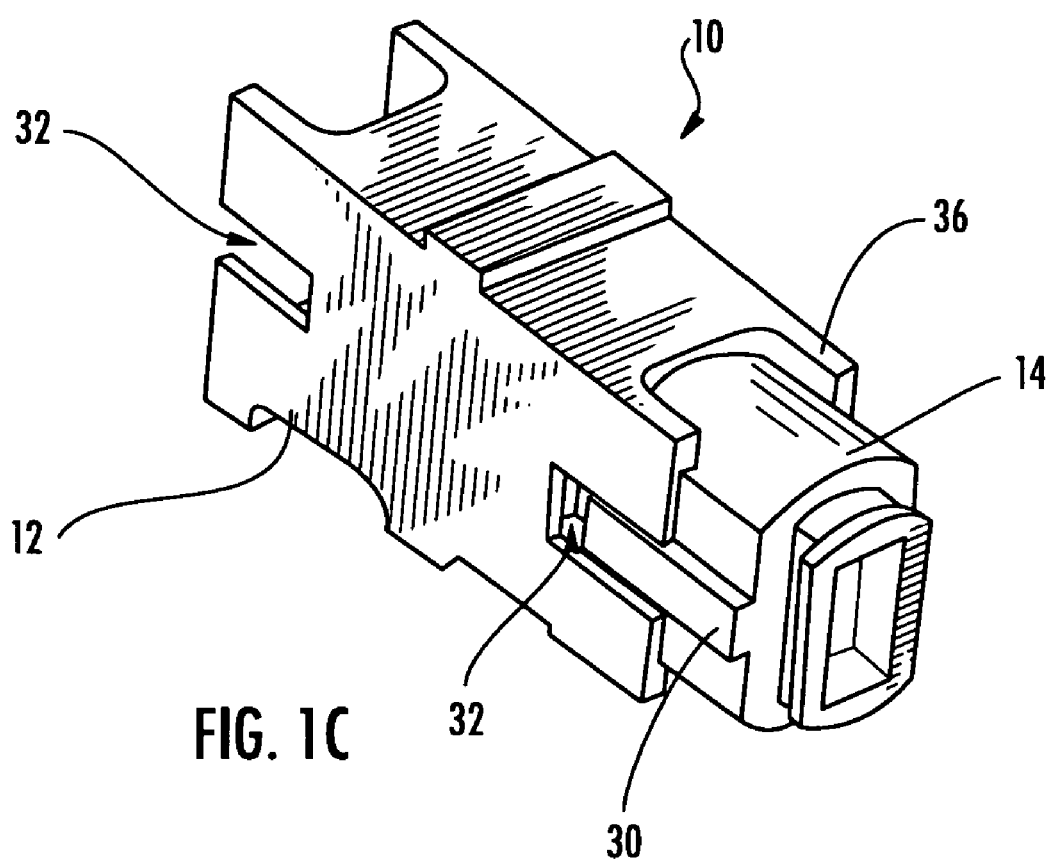
Figure 1D:
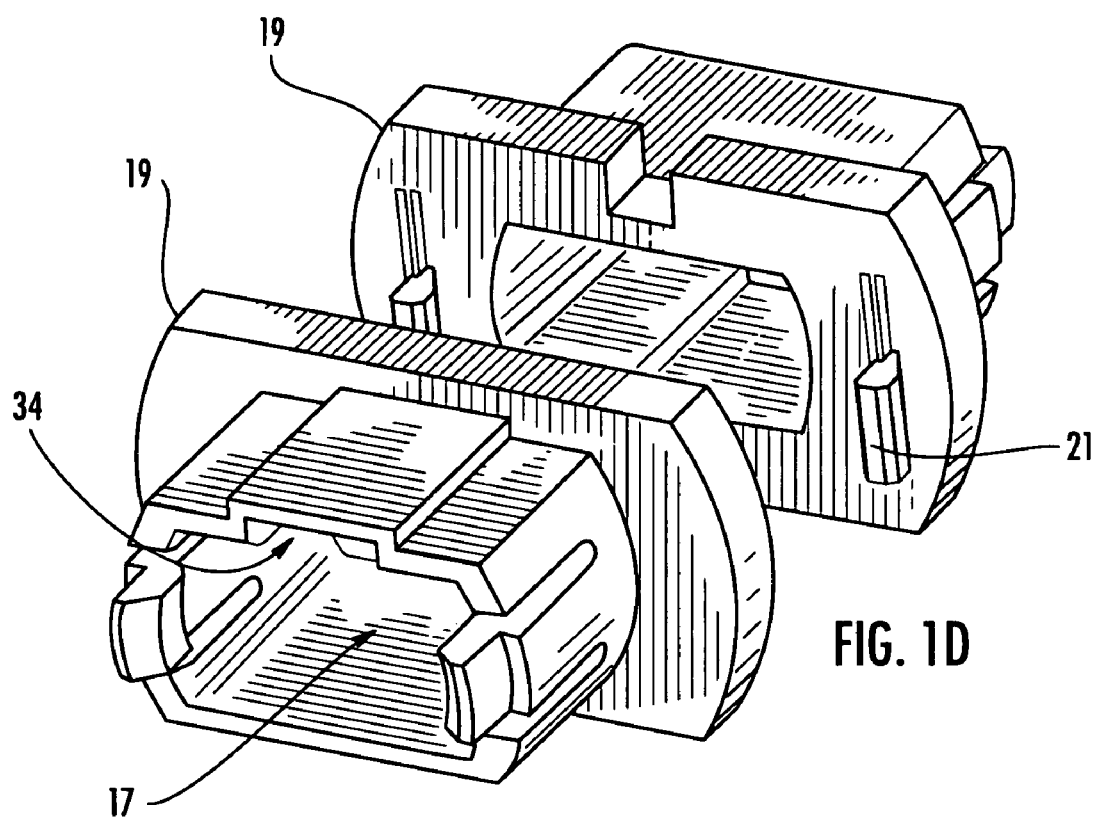
FIG. 1D is a perspective view of alignment sleeves that may be maintained within the adapter shown in FIGS. 1A and 1C.

Referring to FIGS. 1A-D, one embodiment of a new MTP adapter assembly 10 and new MTP plug 14 of the present invention are shown. FIGS. 1A and 1B show the adapter and plug disengaged, FIG. 1C shows the adapter and plug engaged, and FIG. 1D shows the alignment sleeve removed from the adapter. The adapter 10 comprises an outer adapter housing 12 defining a first end 18, a second end 20 and an internal cavity 16 for receiving an alignment sleeve 19 operable for receiving, aligning and maintaining a portion of at least one plug 14. The adapter housing 12 may be integrally formed, or may include one or more joined together components. As shown, the housing 12 has a generally rectangular box-shaped configuration. A shoulder 22, or flange, may be provided for permitting the adapter assembly to be mounted to other components and/or to act as a mounting stop. As shown, the shoulder 22 is located about substantially midway along the length of the housing 12. In embodiments in which the housing 12 is comprised of two halves, the shoulder 22 may be found on one component or each component may include a portion of the shoulder.

The adapter 10 may be sized and shaped to accommodate a variety of different types of alignment sleeves and plugs. Referring to FIG. 1D, one or more alignment sleeves may be inserted and thereafter retained in a known manner, such as by latching arms 21, clips or being held in place between mated connector halves. A first alignment sleeve may be inserted into the internal cavity 16 via the first end 18 of the adapter housing 12 and a second, dissimilar alignment sleeve may be inserted through the second end 20 of the adapter housing 12 such that optical connectors having distinct configurations may be interconnected. By way of example, the first alignment sleeve may accommodate a new or conventional plug including an industry standard MTP connector, and the second alignment sleeve may accommodate a CON2R-MT type connector available from Corning Cable Systems of Hickory, N.C. The alignment sleeve 19 may also be unitary while accommodating similar or different connector types. The alignment sleeve 19 defines a lengthwise extending passageway 17. Referring to FIG. 1B, the new MTP plug 14, shown without a drop cable or boot, defines a connective end 24 with an extended snout for presenting at least one optical fiber for mating and a back end 26 for receiving the drop cable. The extended snout provides greater surface area contact with an alignment sleeve as compared to conventional MTP connectors. The extended snout provides greater resistance to forces, such as cable pulling forces at an angle to the snout, as compared to conventional MTP connectors. The adapter 10 and plug 14 may be made from a thermoplastic material, such as nylon or ULTEM™ material provided by General Electric Company, or may be made from metal, ceramic or other material.

Extending longitudinally along the plug 14 are one or more rib features 30 that are received within alignment slots 32, 34 defined by the adapter housing 12 and alignment sleeve 19, respectively. As best show in FIG. 1B, the rib features 30 extend laterally outward. The one or more rib features 30 may also function as keys received within key slots 32, 34. Although a new MTP plug is shown inserted into a new MTP adapter, a conventional MTP plug may be inserted into a new MTP adapter, however, the conventional MTP plug does not include the rib features 30 that reduce side load forces. The added rib feature 30 on the new MTP plug 14 improves the engagement length and prevents side loads from reaching the ferrule. Further, the new MTP plug 14 may be inserted into a conventional MTP adapter without rib feature interference because the shroud features 36 on the new MTP adapter are not present on a conventional MTP adapter. The extended shroud features 36 define slots 32 and are configured to fit around the outer surface of the plug 14. Proper mating orientation may be provided by marking the adapter assembly 10 or plug 14 so that a less skilled field technician can readily mate the two.

Figure 2A:
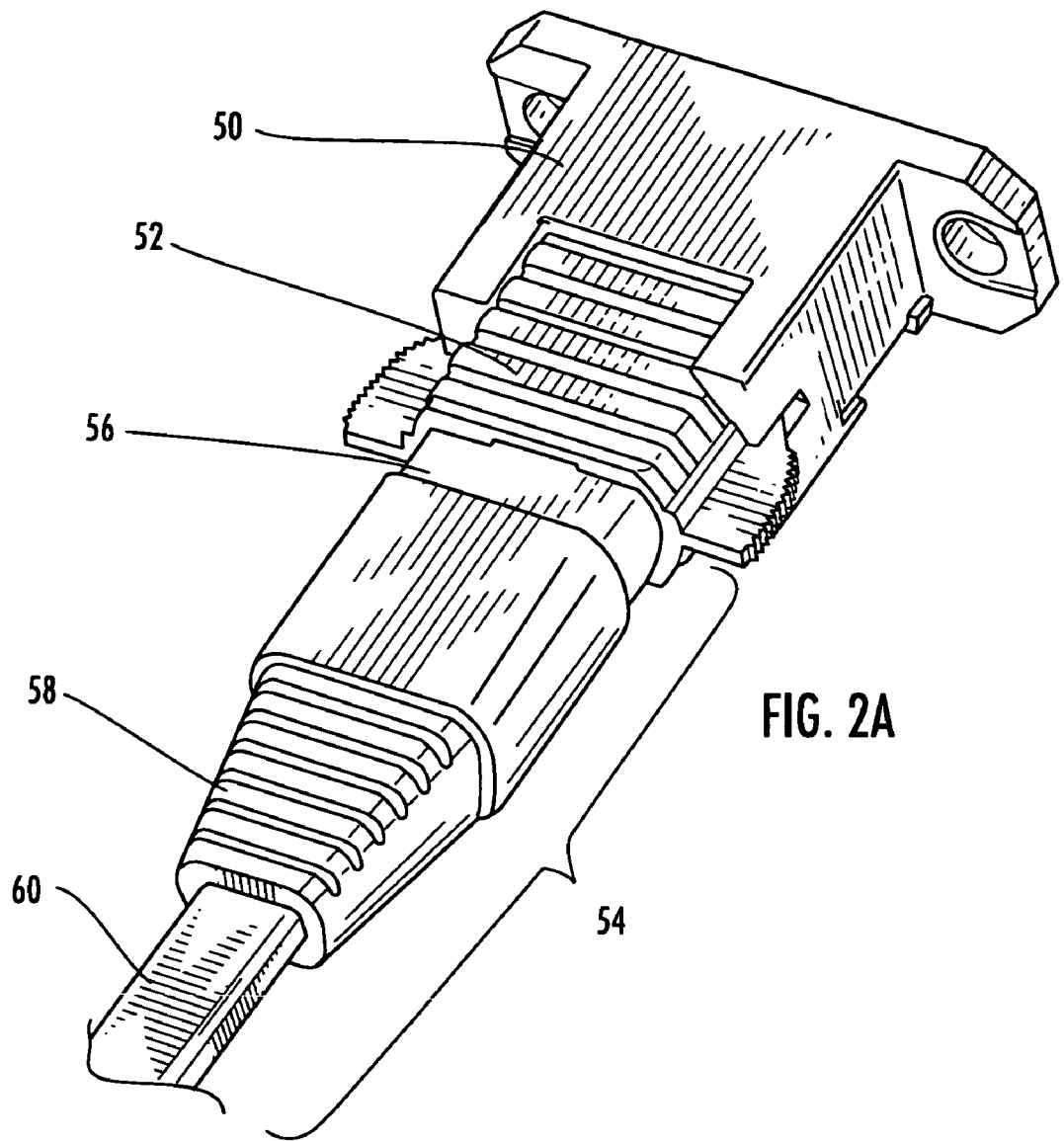
FIGS. 2A-C are perspective views of a corresponding adapter and plug housing shown in engaged and disengaged configurations and illustrating fins received within slots.
Figure 2B:
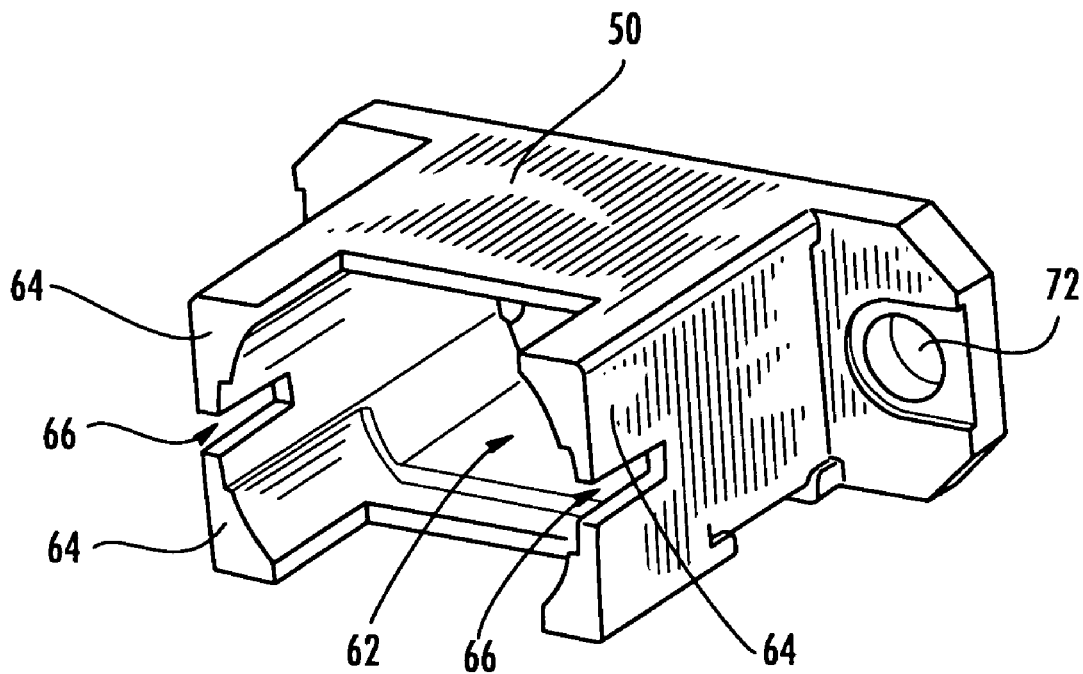
Figure 2C:
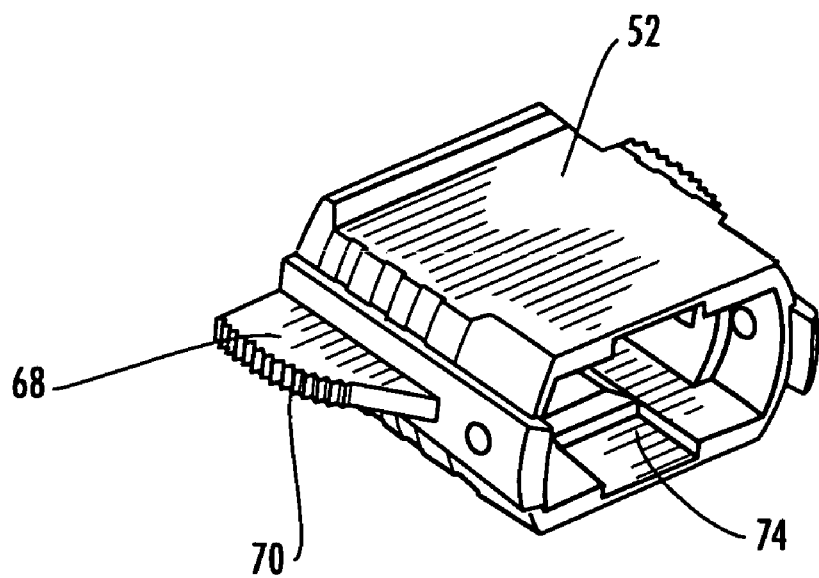

Referring to FIGS. 2A-C, another embodiment of an adapter assembly is shown. The adapter 50 is adapted to receive a plug housing 52. The plug housing 52 is adapted to receive a connector 54, also referred to herein as a "plug." The connector 54 as shown includes a connective end 56, a boot 58 and a mounted upon drop cable 60. Referring to FIGS. 2B-C, the adapter 50 defines a cavity 62 having a specific geometry for receiving a corresponding plug housing 52. The adapter 50 further defines a lengthwise extending shroud 64 defining slots 66 therein for receiving alignment and pulling features 68 of the plug housing. In the embodiment shown, a pair of slots 66 receives a corresponding pair of pulling features 68 of the pull. The pulling features 68 define a gripping surface for aiding in inserting and removing the plug housing 52 into and from the adapter 50. The adapter 50 may define mounting openings 72 for receiving mounting hardware including, but not limited to, screws, pins, snaps, rivets or other fasteners.

The plug housing 52 functions to reduce or eliminate forces placed upon the ferrule during loading and removal. The adapter 50 is lengthened to accept and partially surround the plug housing 52. The plug housing 52 is handled during loading and unloading. The plug housing 52 defines a passageway 74 therethrough for allowing connectors to mate. The use of the plug housing 52 provides an increased resistance to mechanical forces, such as side load forces. The plug housing stabilizing features 68 and slots 66 provide alignment, and in some embodiments provide keying. Clearances between the various components are preferably tightened up to substantially eliminate play between components and prevent forces from reaching the ferrule. In the embodiment shown in FIGS. 2A-C, the adapter and plug housing together substantially eliminate excess wiggle in the wide plane, and the lengthened snout of the adapter further reduces this problem.

Referring to the connector 54 shown in FIG. 2A, and the connectors shown generally throughout, the connector 54 may have an outer body that is slid over an inner body. In operation, the outer body may be grasped by fingers of a field technician to push-pull the connector into engagement with the plug housing 52 and the sleeve 50. In the case of a multi-fiber ferrule, the ferrule generally defines two guide pin holes and at least one row of fiber bores that open through the end face of the ferrule.

Figure 3A:
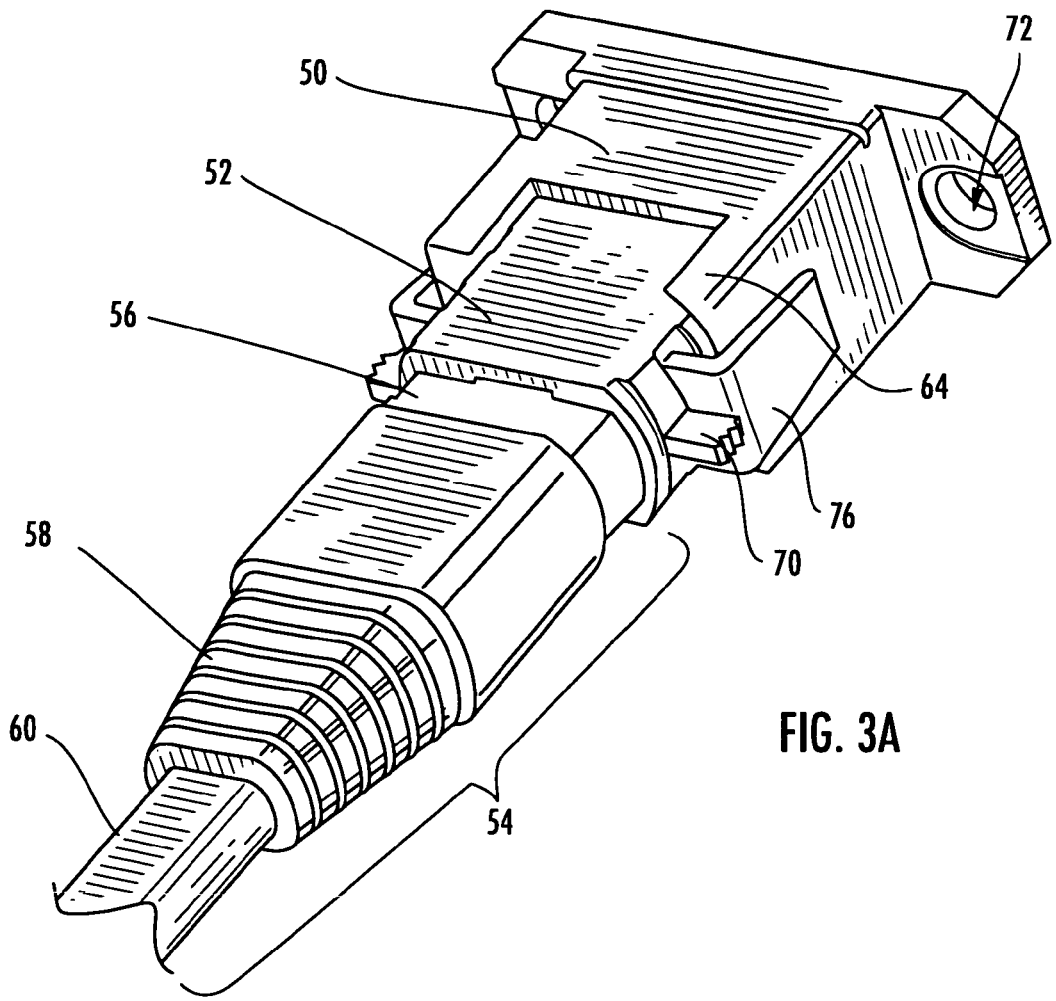
FIGS. 3A-C are perspective views of another embodiment of an adapter and plug housing shown in engaged and disengaged configurations and illustrating attachment arms.
Figure 3B:
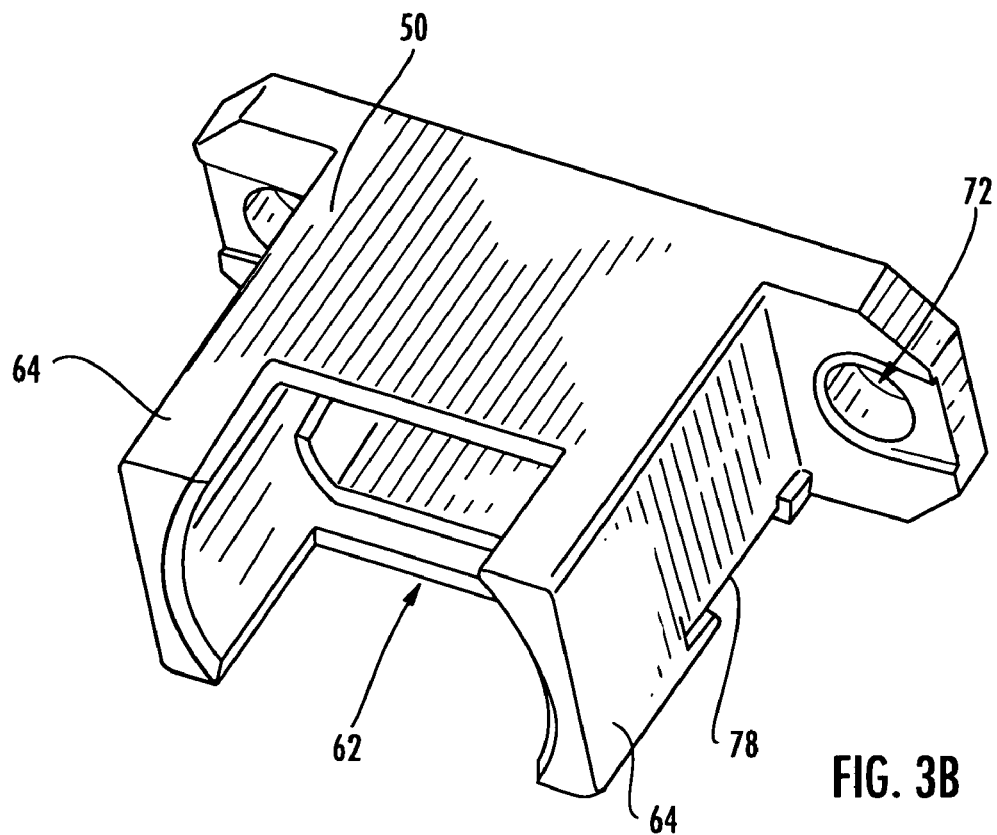
Figure 3C:
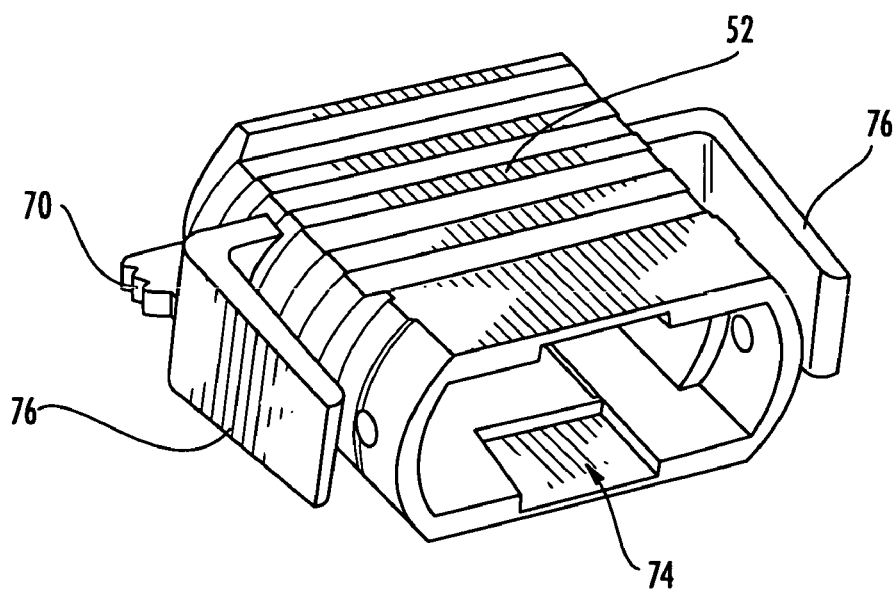

Referring to FIGS. 3A-C, another embodiment of an adapter assembly is shown. The adapter 50 is adapted to receive a plug housing 52. The plug housing 52 is adapted to receive a connector 54. The connector 54 as shown includes a connective end 56, a boot 58 and a mounted upon drop cable 60. Referring to FIGS. 3B-C, the adapter 50 defines a cavity 62 having a specific geometry for receiving a corresponding plug housing 52. The adapter 50 further defines a lengthwise extending shroud 64. This plug housing 52 design variation utilizes wrap-around arms 76 that engage with the sides 78 of the adapter 50 to prevent excess "wiggle" or side-to-side movement while inserting or removing. The extra length of the adapter shown at reference number 64 preferably is close fitting with the geometry of the plug housing 52 to further reduce any play between the components. The arms 76 define a gripping surface portion 70 for aiding in inserting and removing the plug housing 52 into and from the adapter 50. The adapter 50 may define mounting openings 72 for receiving mounting hardware including, but not limited to, screws, pins, snaps, rivets or other fasteners.

As shown, the adapter 50 generally comprises one half of a two component configuration that is typically attached together in a known manner to create an adapter sleeve. As described above, the adapter sleeve may be unitary. The plug housing 52 may define a keyway 74 that receives a key (not shown) of the adapter 50. The adapter 50 and plug housing 52 cooperate to prevent side load forces from reaching the ferrule.

Figure 4A:
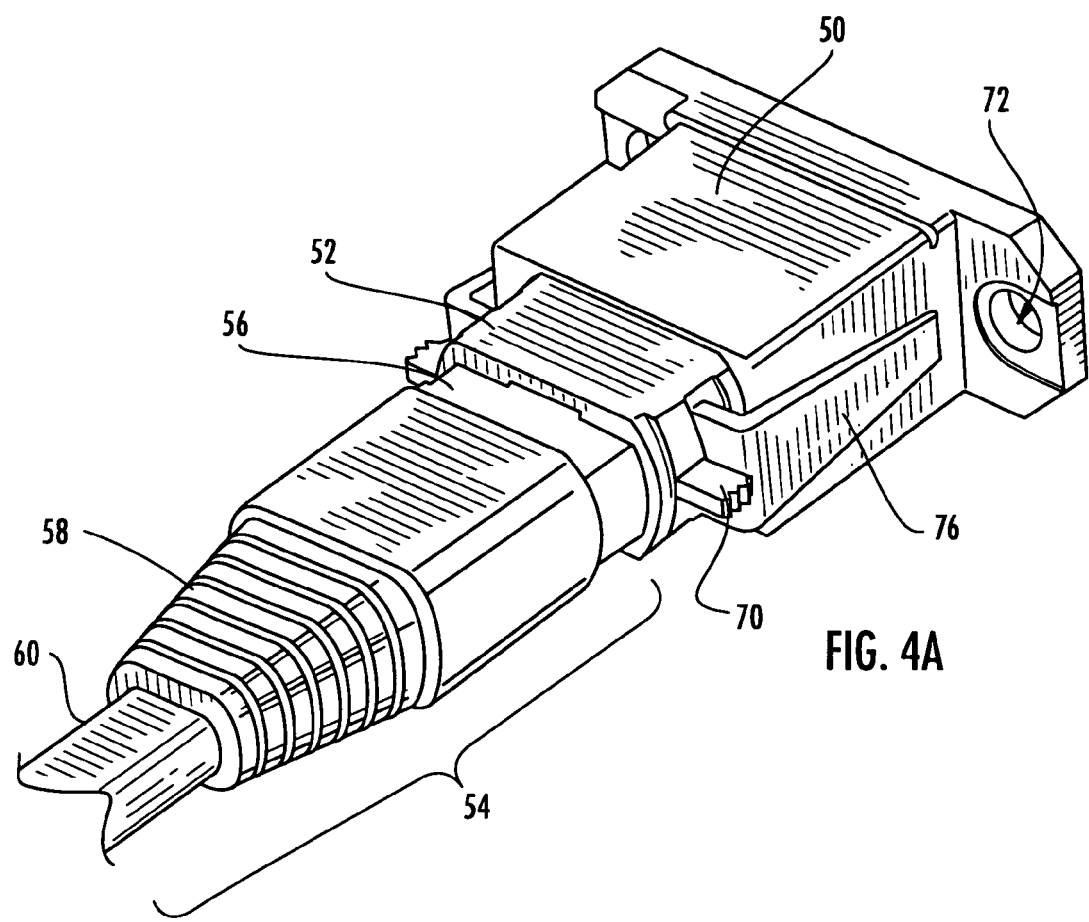
FIGS. 4A-C are perspective views of another embodiment of an adapter and plug housing shown in engaged and disengaged configurations and illustrating extending attachment arms.
Figure 4B:
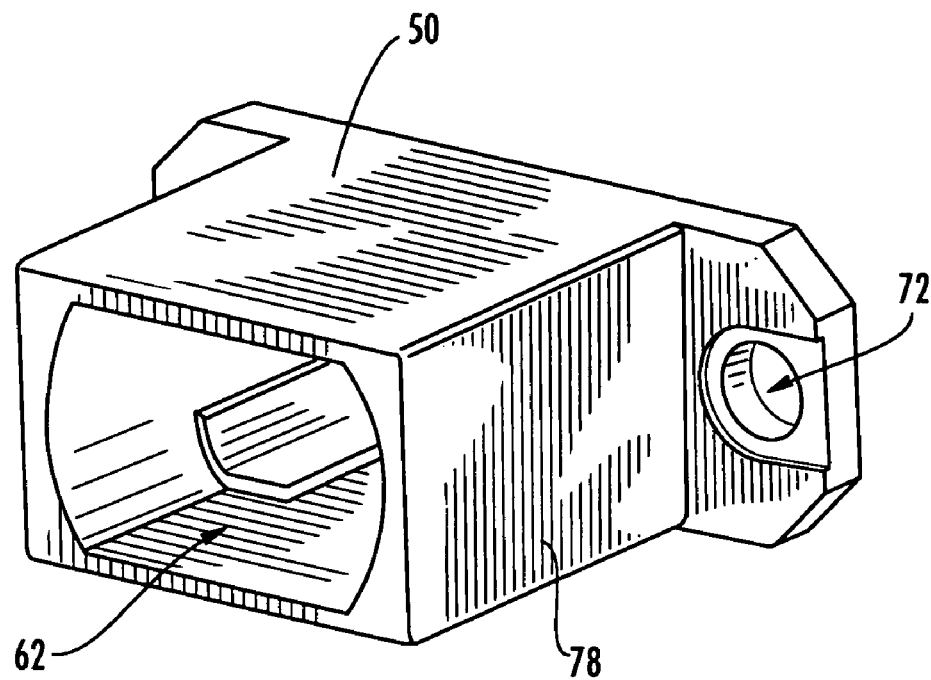
Figure 4C:
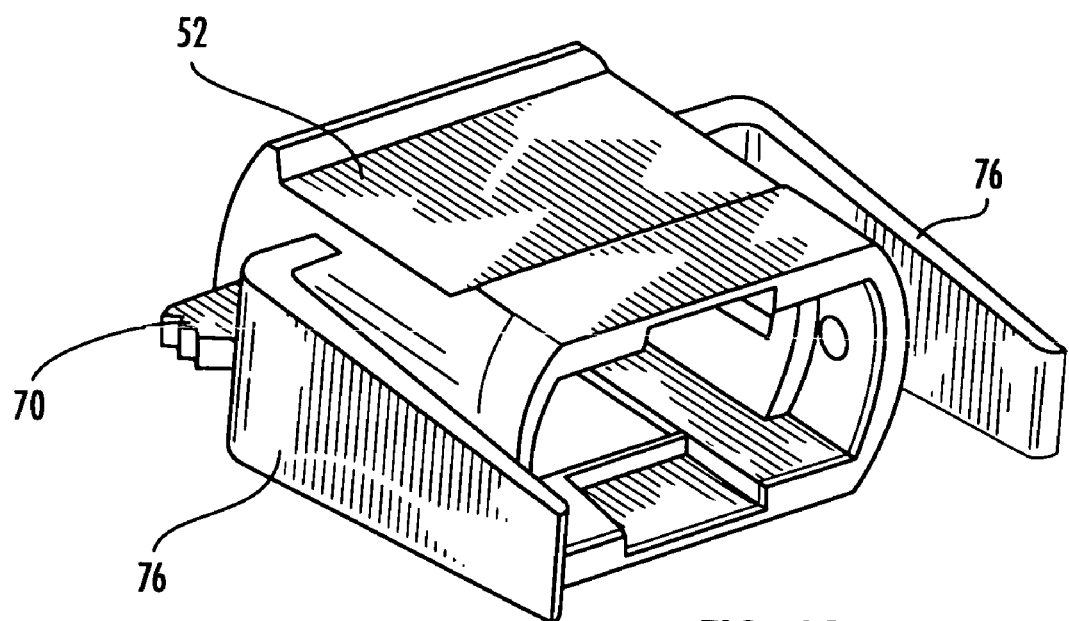

Referring to FIGS. 4A-C, another embodiment of an adapter assembly is shown. The adapter 50 is adapted to receive a plug housing 52. The plug housing 52 is adapted to receive a connector 54. The connector 54 as shown includes a connective end 56, a boot 58 and a mounted upon drop cable 60. The adapter 50 defines a cavity 62 having a specific geometry for receiving a corresponding plug housing 52. This plug housing 52 design variation utilizes wrap-around arms 76 that have a length sufficient to fully engage the sides 78 of the adapter 50 to prevent excess "wiggle" or side-to-side movement while inserting or removing. The arms 76, for example, may be about 12 mm long and correspond to the length of the adapter 50. The adapter 50 has the clip-recess geometry removed. A cut-out in the adapter 50 above and below the pull 52 is also removed, substantially eliminating any possible bending of the extensions as on the previous designs. The arms 76 are preferably close fitting with the geometry of the adapter 50 to reduce any play between the components. The arms 76 define a gripping surface portion 70 for aiding in inserting and removing the plug housing 52 into and from the adapter 50. The adapter 50 may define mounting openings 72 for receiving mounting hardware including, but not limited to, screws, pins, snaps, rivets or other fasteners.

Figure 5A:
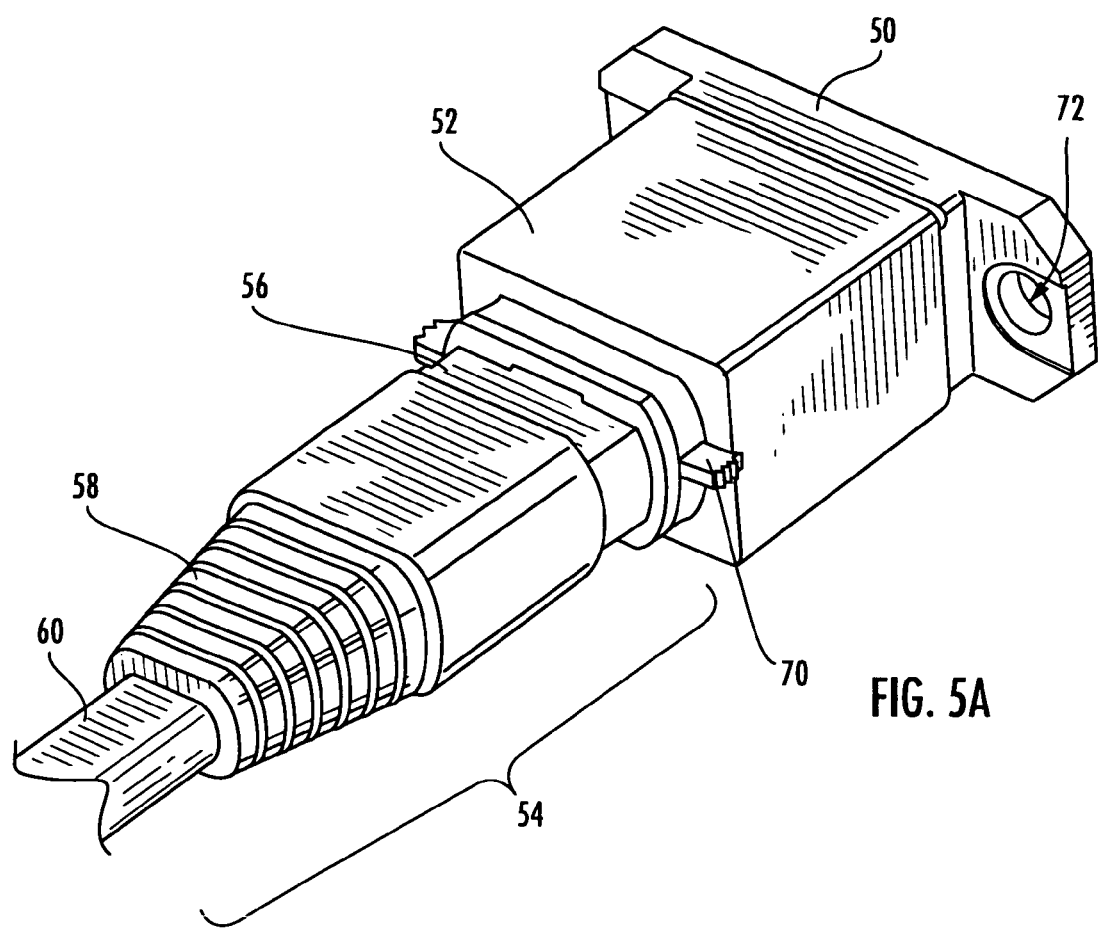
FIGS. 5A-C are perspective views of another embodiment of an adapter and plug housing shown in engaged and disengaged configurations and illustrating a plug housing inserted into a cavity of the adapter.
Figure 5B:
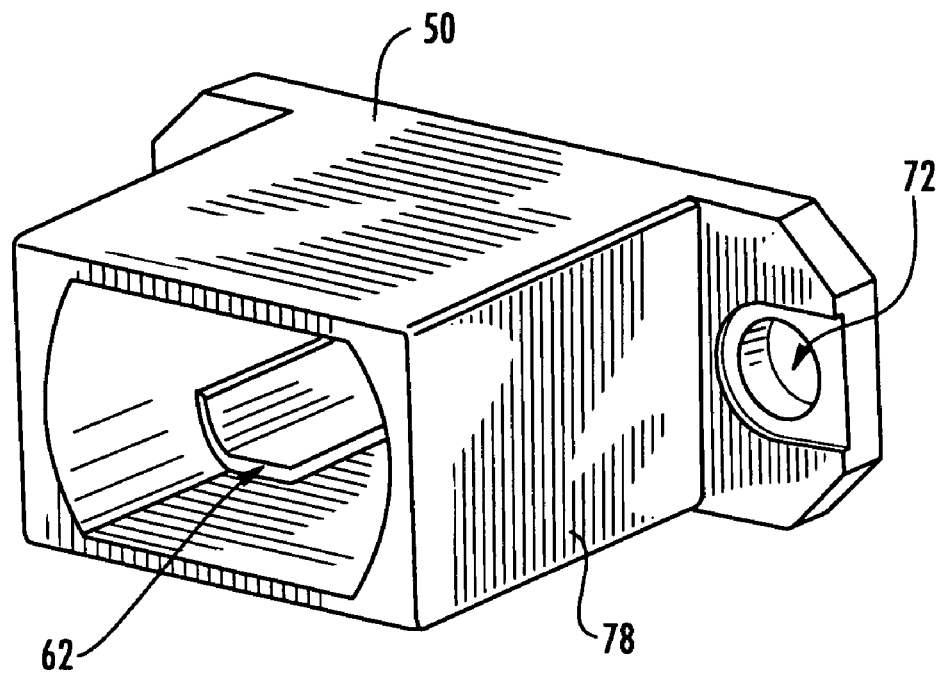
Figure 5C:
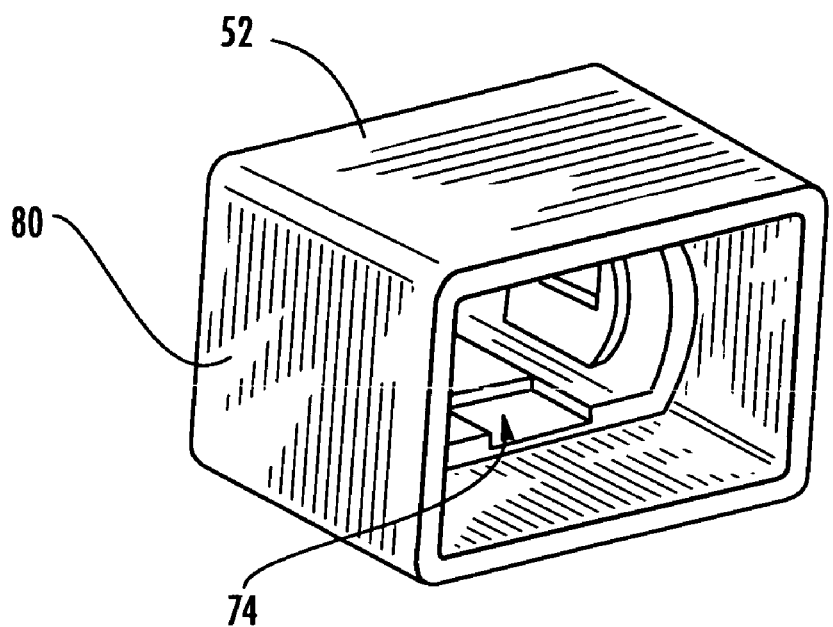

Referring to FIGS. 5A-C, another embodiment of an adapter assembly is shown. The adapter 50 is adapted to receive a plug housing 52. The plug housing 52 is adapted to receive a connector 54. The connector 54 as shown includes a connective end 56, a boot 58 and a mounted upon drop cable 60. The adapter 50 defines a cavity 62 having a specific geometry for receiving the connector 54. This plug housing 52 design variation utilizes a full-surround, cup-shaped pull that substantially surrounds the adapter 50, thus interfering with all sides 78 of the adapter 50 to provide stability between the components and prevent excess "wiggle" or side-to-side and up-and-down movement while inserting or removing. Referring specifically to FIG. 5A, the plug housing 52 defines a gripping surface portion 70 for engaging and disengaging the plug housing 52 with the adapter 50. The adapter 50 may define mounting openings 72 for receiving mounting hardware including, but not limited to, screws, pins, snaps, rivets or other fasteners.

Figure 6A:
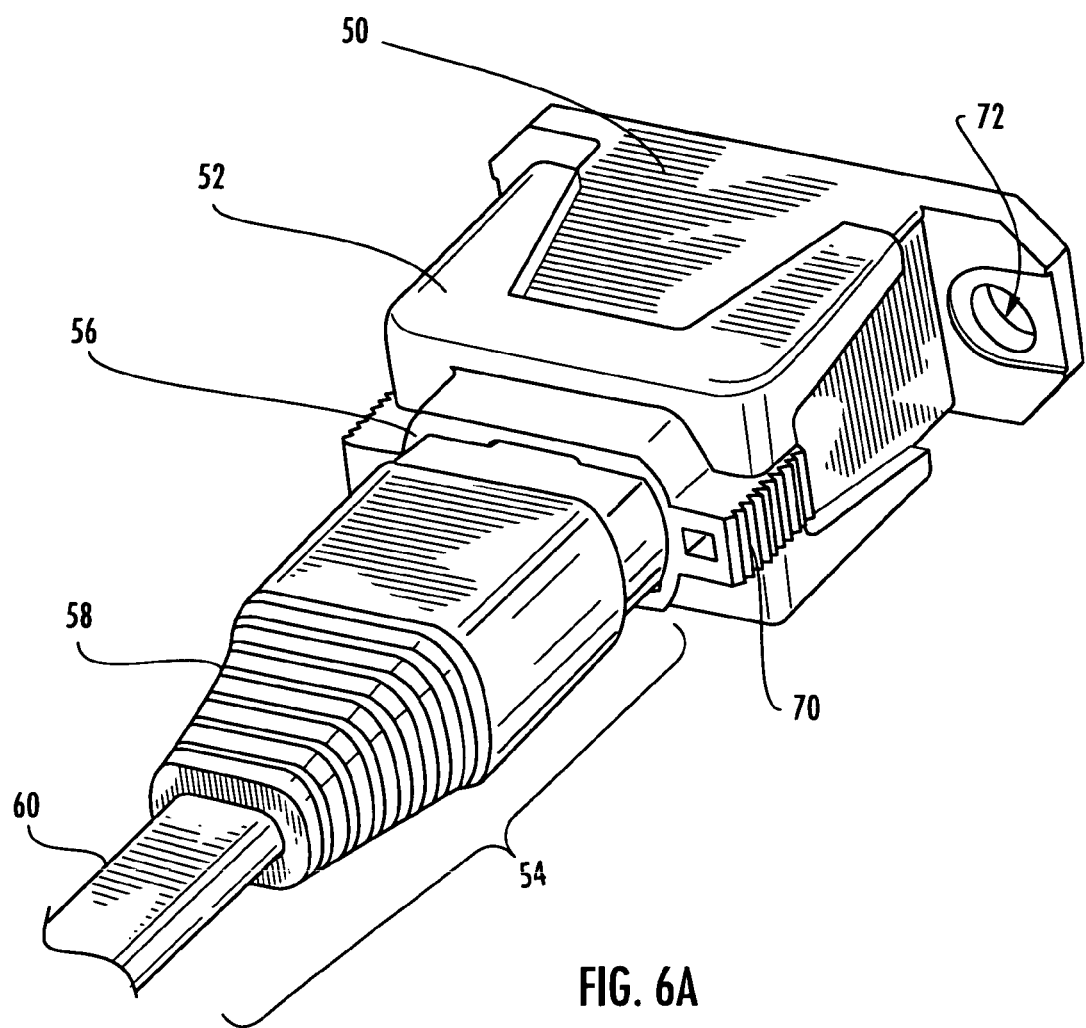
FIGS. 6A-C are perspective views of another embodiment of an adapter and plug housing shown in engaged and disengaged configurations and illustrating plug housing attachment arms received over corners of the adapter.
Figure 6B:
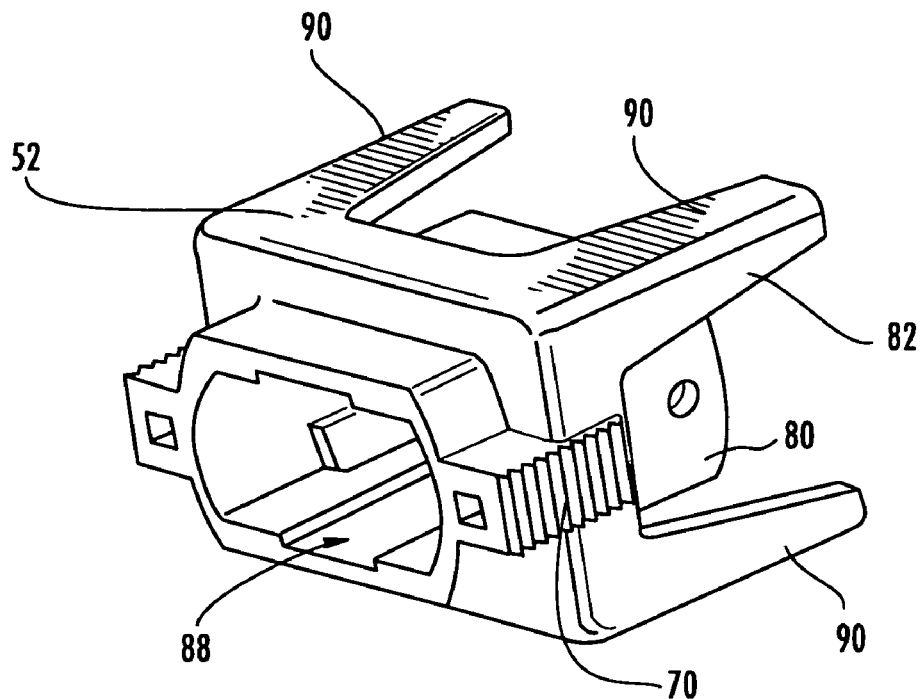
Figure 6C:
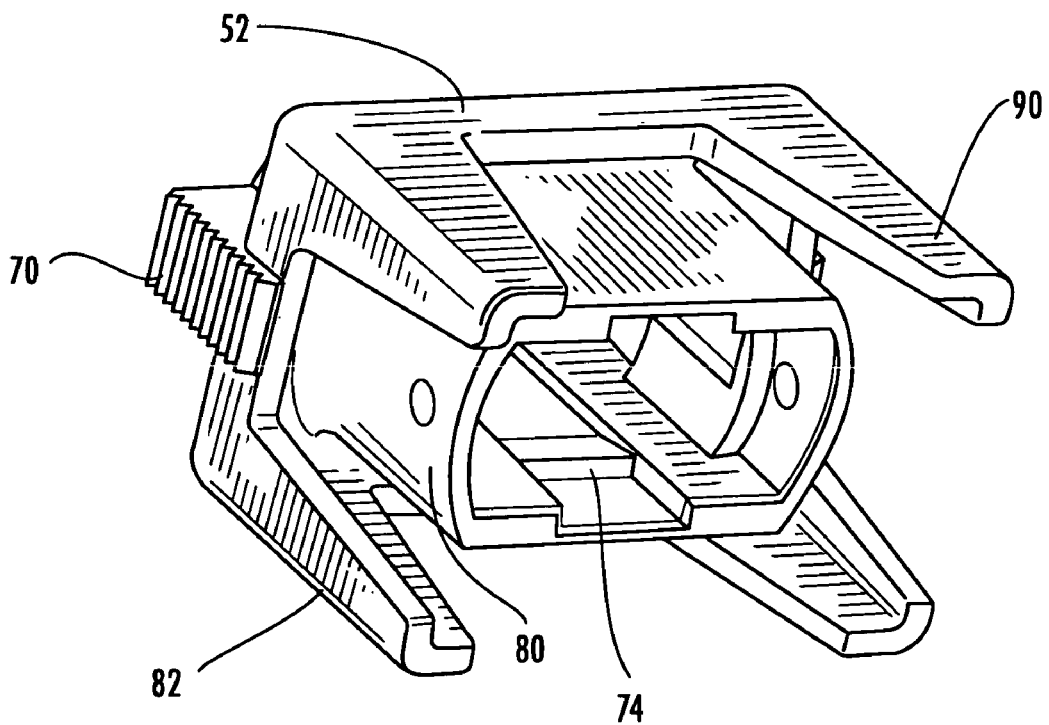

Referring to FIGS. 6A-C, another embodiment of an adapter assembly is shown. The adapter 50 is adapted to receive a plug housing 52. The plug housing 52 is adapted to receive a connector 54. The connector 54 as shown includes a connective end 56, a boot 58 and a mounted upon drop cable 60. The adapter 50 defines a cavity having a specific geometry for receiving a portion of the connector 54. This plug housing 52 design variation utilizes a partial-surround shaped pull 52 that partially surrounds the adapter 50, thus interfering with all corners of the adapter 50 to provide stability between the components and prevent excess "wiggle," or movement along both axes, while inserting or removing. The plug housing 52 defines a gripping surface portion 70 for engaging and disengaging the plug housing 52 with the adapter 50. The adapter 50 may define mounting openings 72 for receiving mounting hardware including, but not limited to, screws, pins, snaps, rivets or other fasteners.

This variation keeps the full surround concept while eliminating large areas of inconsequential material. This windowing effect has several benefits including less injected product to make the pull, the ability to retain identical adapter parts as in the previous embodiment and the ability to retain the original release holes on the inner geometry while providing the same protection against mechanical forces, such as side load forces. The plug housing 52 is provided with an internal portion 80 and an external portion 82. The internal portion 80 is inserted into the adapter cavity and may be provided with alignment and keying features that prevent unauthorized and improper loading of the fiber optic connector. As in other embodiments, the fiber optic connector is inserted through a passageway 88 extending through the internal portion 80. The outer housing 82 is provided with a plurality of arms 90 that extend over the adapter 50, for example, extending over the corners of the adapter 50. The arms 90 are designed such that they fully encase the corners of the adapter 50 and taper along the length thereof. The geometry of the arms 90 is such that both vertical and horizontal movement of an inserted fiber optic connector is limited.

Figure 7:
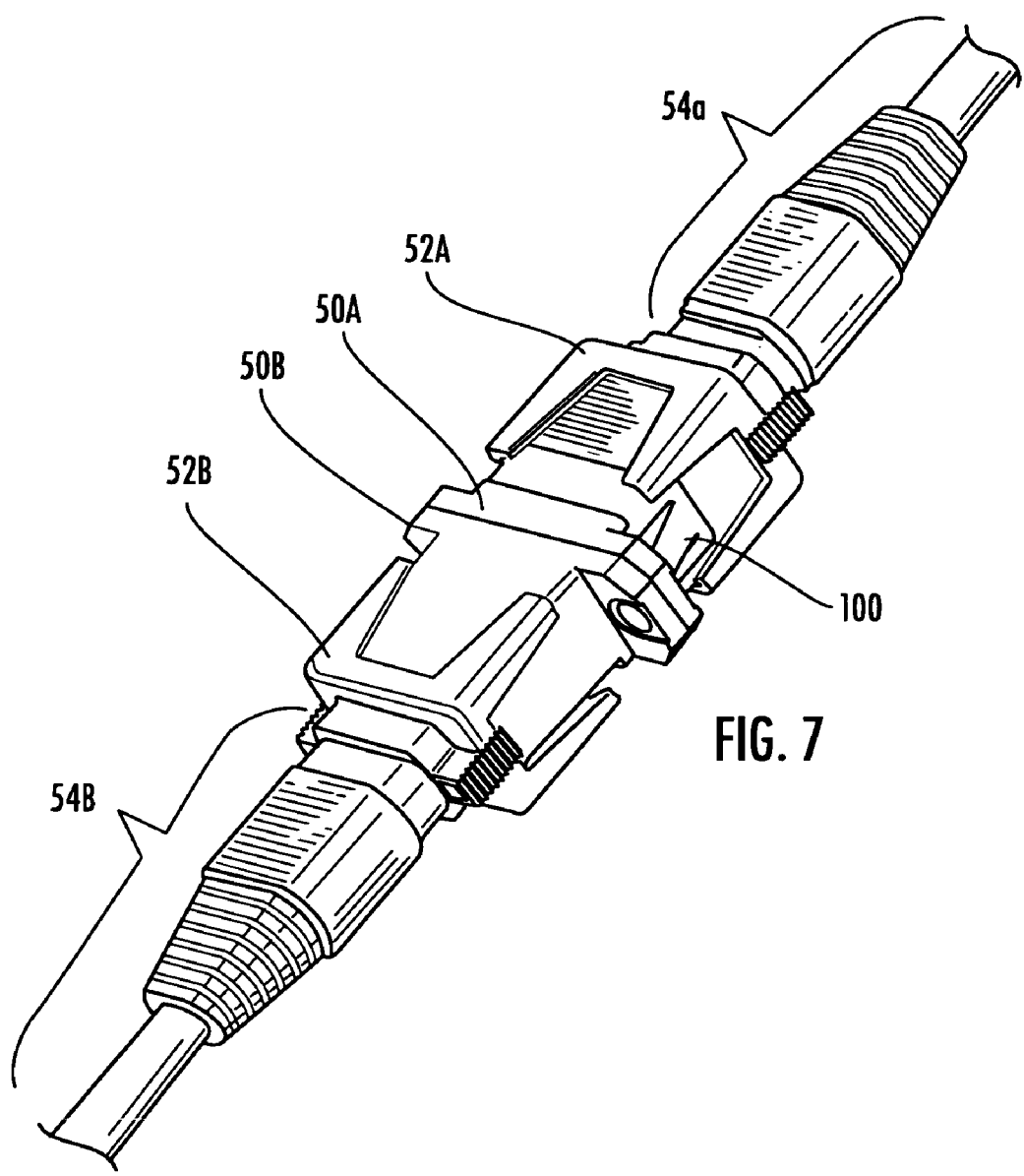
FIG. 7 illustrates plug housing geometry to allow the unimpeded use of a cabinet locking clip, enabling the use of identical adapters.

Referring to FIG. 7, mating fiber optic connectors 54A and 54B are shown received within their respective adapters 50A and 50B. Specifically, first connector 54A including at least one ferrule is received within plug housing 52A, which is received within adapter 50A. Second connector 54B including at least one ferrule is received within plug housing 52B, which is received within adapter 50B. The plug housing geometry allows the unimpeded use of a cabinet locking clip 100, enabling the use of identical outer adapter sleeves.

Figure 8B:
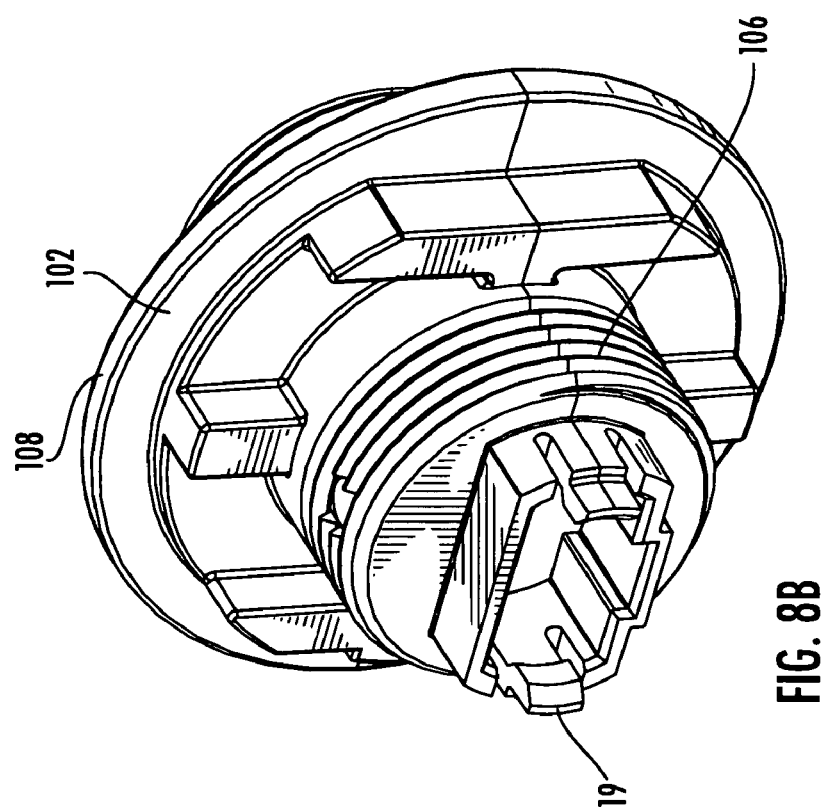
FIGS. 8A-B are perspective views of each side of an adapter for mating dissimilar connectors.
Figure 8A:
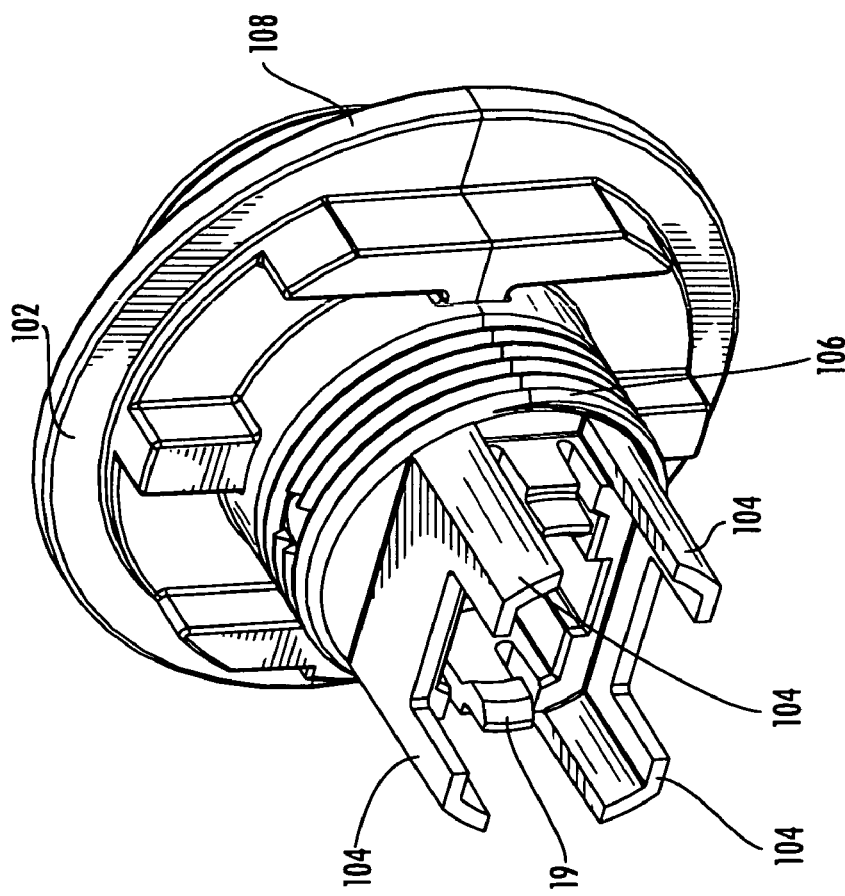

Referring to FIGS. 8A-B and 9, a CON2R-MT to MTP adapter is shown. The adapter may be maintained within a connector port of a connection terminal, for example, a multi-port connection terminal available from Corning Cable Systems of Hickory, N.C. The adapter 102 enables the use of industry standard MTP componentry in FTTx systems. In addition to enabling the interconnection of dissimilar connector types, the hybrid adapter 102 improves the robustness of the MTP connector under side load forces. The MTP sleeve 19 is integrated into the CON2R adapter 102, allow accurate registration because the entire assembly is integrally formed. Conventional designs generally include multiple components, for example four, which leads to side load issues as well as difficulty in keeping a tight part fit throughout the life of the assembly. To further address ferrule side load and chipping issues, as in previous embodiments, protrusions 104 are provided on the adapter 102 that provide accurate, lengthened engagement to the MTP plug housing 52. This insures that the MTP connector is aligned accurately along the long fiber axis and also serves to bolster the rigidity of the package in the short axis as well during disengagement, all while maintaining compatibility to an industry standard plug. The adapter 102 may further define an externally threaded portion 106 for threadably engaging an internally threaded housing. The adapter 102 may further define a flange 108 having a substantially flat geometry for mounting against a wall (not shown). The stabilizing protrusions 104 may be configured in a variety of geometries as illustrated in the several previous embodiments. Referring specifically to FIG. 9, the protrusions 104 and a plug housing may be keyed. As shown, the protrusion 104 includes at least one key slot 110 for receiving at least one key 112 of the plug housing 52.

Permissible variations intended to be covered within the scope of the present invention include alternative assembly designs that add rigidity and alignment length to connector engagement. These features reduce the tendency of current MTP packages to suffer from ferrule chipping in plugs disengaged with side load present. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An adapter assembly for coupling dissimilar fiber optic connectors each having an outer surface, comprising:
   an adapter housing defining a first end, a second end, and an internal cavity, wherein the first and second housing ends include respective extensions;
   an alignment sleeve received in the adapter housing internal cavity and having a first end with an opening configured to receive and surround at least a portion of the first fiber optic connector outer surface, a second end configured to receive and surround at least a portion of the second fiber optic connector outer surface, the alignment sleeve having an internal passageway extending therethrough; and
   first and second key-type alignment features respectively maintained at the adapter housing first and second ends and configured to receive corresponding first and second complementary key-type alignment features on the first and second fiber optic connectors;
   wherein the adapter housing extensions at the first and second housing ends are configured to respectively engage the first and second connector outer surfaces when said first and second connector ends engage the respective first and second alignment sleeve ends.

2. The adapter assembly of claim 1, wherein the first fiber optic connector is an industry standard MTP-type connector and the second fiber optic connector is a CON2R-MT-type connector.

3. The adapter assembly of claim 1, wherein the adapter housing includes first and second halves.

4. The adapter assembly of claim 1, wherein the adapter housing is a unitary component.

5. The adapter assembly of claim 1, wherein the at least on key-type feature defines at least one guide channel for receiving at least one rib of the first and second fiber optic connectors.

6. The adapter assembly of claim 1, wherein at least one connector end includes a plug housing that defines a gripping surface that facilitates engaging and disengaging the at least one plug housing with/from the adapter housing.

7. A fiber optic interconnection assembly, comprising:
   at least one fiber optic connector including an outer surface and a connective end for presenting at least one optical fiber;
   at least one plug housing having an outer surface and removably engaged with the at least one fiber optic connector and surrounding at least a portion of said connector outer surface, the at least one plug housing defining a passage therethrough for presenting the connective end of the at least one fiber optic connector for optical connection, the at least one plug housing further defining at least two stabilizing features disposed on opposite sides of the at least one plug housing and arranged along a wide plane of the passage;
   and
   an adapter assembly defining a receiving end for receiving and surrounding at least a portion of the plug housing outer surface of the at least one plug housing and defining at least one feature for cooperating with the at least one stabilizing feature to reduce movement between engaged components, wherein the at least two stabilizing features extend beyond the side of the adapter assembly.

8. The assembly of claim 7, wherein the adapter assembly includes an alignment member retained within for facilitating connector alignment.

9. The assembly of claim 7, wherein the at least two stabilizing features includes at least one of a key and a key slot that engages with at least one of a key and a key slot of the adapter assembly.

10. The assembly of claim 7, wherein the fiber optic connector is selected from the group consisting of SC, LC, FC, MTP and CON2R-MT connectors.

11. The assembly of claim 7, wherein the at least one plug housing defines a gripping surface for facilitating insertion and removal.

12. The assembly of claim 7, wherein the at least two stabilizing features interfere with a portion of the adapter assembly to reduce movement between engaged components.

13. The assembly of claim 7, wherein one of the at least two stabilizing features is one or more arms.

14. The assembly of claim 7, wherein one of the at least two stabilizing features is substantially cup-shaped.

15. An adapter assembly for receiving and maintaining mating of first and second dissimilar fiber optic connectors, comprising:
   a housing having a first end configured to receive the first fiber optic connector from a first direction with an MTP sleeve integrated into the first end, and a second end configured to receive the second fiber optic connector from a second direction, wherein at least the first end has at least one shroud feature, the at least one shroud feature having a plurality of protrusions being arranged quadrilaterally and generally extending in the direction of a fiber axis from the first end of the housing where both the first end and the second end have an externally threaded portions; and
   an internal passageway extending through the housing from the first end to the second end so as to allow for an optical connection between the first and second fiber optic connectors.

16. The adapter assembly of claim 15, wherein at least one of the first and the second fiber optic connectors are engaged within a plug housing defining at least one stabilizing feature that engages with a portion of the housing.

17. The adapter assembly of claim 15, wherein the first fiber optic connector is an industry standard MTP connector and the second fiber optic connector is a CON2R-MT connector.

18. The adapter assembly of claim 16, wherein the first and second connectors have respective first and second outer surface, and wherein the plug housing has first and second ends that respectively surround at least a portion of the first and second connector outer surfaces.

19. The adapter assembly of claim 15, further including a round flange disposed between the first end and the second end.

20. The adapter assembly of claim 19, the round flange having a generally flat portion for mounting.

21. An adapter assembly for receiving and maintaining mating of first and second dissimilar fiber optic connectors, comprising:
   a housing having a first end configured to receive the first fiber optic connector from a first direction with an MTP sleeve integrated into the first end, and a second end configured to receive the second fiber optic connector from a second direction, wherein at least the first end has at least one shroud feature, the at least one shroud feature having a plurality of protrusions being arranged quadrilaterally and generally extending in the direction of a fiber axis from the first end of the housing where the second end has an externally threaded portion; and an internal passageway extending through the housing from the first end to the second end so as to allow for an optical connection between the first and second fiber optic connectors.

22. The adapter assembly of claim 21, wherein the first end has an externally threaded portion.

23. The adapter assembly of claim 21, wherein at least one of the first and the second fiber optic connectors are engaged within a plug housing defining at least one stabilizing feature that engages with a portion of the housing.

24. The adapter assembly of claim 23, wherein the first fiber optic connector is an industry standard MTP connector and the second fiber optic connector is a CON2R-MT connector.

25. The adapter assembly of claim 23, wherein the first and second connectors have respective first and second outer surface, and wherein the plug housing has first and second ends that respectively surround at least a portion of the first and second connector outer surfaces.

26. The adapter assembly of claim 21, further including a round flange disposed between the first end and the second end.

27. The adapter assembly of claim 26, the round flange having a generally flat portion for mounting.

* * * * *